Patented Dec. 22, 1953

2,663,652

UNITED STATES PATENT OFFICE 2,663,652

PROCESS FOR COATING WITH POLYETHYLENE

Wilford E. Railing, Penns Grove, N. J., assignor to E. I. du Pont de Nemours and Company, Wilmington, Del., a corporation of Delaware No Drawing. Application March 4, 1950, Serial No. 147,770

10 Claims. (Cl. 117—21)

1

This invention relates to an improved process for coating surfaces with polyethylene, and to compositions for use in that process.

High molecular weight polyethylene, particularly that of a grade 10 or lower, is an excellent material for use as a protective coating for metallic and other surfaces because of its high chemical resistance, extreme toughness, high flexibility and low cost. The production of continuous coatings that have good adhesion is difficult because of the nature of polyethylene.

In this specification, the numerical grade used in identifying the polyethylene employed is that presently employed in designating the various types of polyethylene. It is an empirical measurement of the melt viscosity of polyethylene and is defined as the number of grams of polyethylene which will be extruded through a 2.1 mm. orifice, 8 mm. long in ten minutes under a pressure of 2.16 kg. on an ½ inch ram, the whole being at a temperature of 190° C. Thus the higher the "grade," the lower the molecular weight. The molecular weight of polyethylene is a complicated function of the vicosity, the values for which are not too certain. It is believed that polyethylene of grade 10 has a molecular weight of around 16,000 to 17,000.

Polyethylene is appreciably soluble only in hot hydrocarbons and halogenated hydrocarbons. The solutions are quite viscous, even at temperatures above 100° C., making application difficult.

The applications of polyethylene by the hot-dip methods are claimed in U. S. Patent 2,429,861 where a 15% solution of polyethylene in a mixture of solvents consisting of 25% saturated hydrocarbons and 75% unsaturated chlorinated hydrocarbons is used at 110° C. The solvents are evaporated off below their boiling point over a period of one hour. This procedure is expensive due to the amount of solvent used and the baking time required and the thickness of coating is not variable over wide ranges, being dependent upon how much of the polyethylene solution adheres to the metal after dipping and draining. Even under the best conditions the coatings formed are not very thick. A similar hot-melt method is disclosed in British Patent 590,052 but in this process the solvents apparently act in part as plasticizers for they are not driven off at higher temperatures. In U. S. Patent 2,406,039 very volatile liquid solvents are used and the resulting films are very thin.

The polyethylenes employed in the present invention are those which are solid at ordinary temperatures, melting at 105° C. or above, but when melted they exhibit high viscosity. Grades of polyethylene from 10 down to 0.005 have been found to give very satisfactory coatings when applied by the present method. Grade 10 has a viscosity of approximately 25,000 poises at 190° C., Grade 2, as used in the examples, has a viscosity of 200,000 poises, while Grade 0.005 has a viscosity of 300,000,000 poises at 190° C. Coatings formed by the direct application of powdered polyethylene alone to hot metal surfaces have been found to be discontinuous and to lack good adhesion.

Polyethylene has been plasticized with various materials (see U. S. Patents 2,405,933, 2,369,471, 2,246,092, 2,448,799, and British Patents 544,359 and 613,018) such as waxes, metallic esters of fatty acids, fatty acid esters, cyclo rubbers, etc., and used as coatings. The resultant coatings lack the toughness and chemical resistance of pure polyethylene. Lower molecular weight polyethylenes (Grade 200 or higher) have been used in the molten state as these are much less viscous than the high molecular weight polymers (British Patents 574,309 and 566,745). The resulting coating, however, is subject to cracking as the lower molecular weight polymers are more brittle. Plasticizing of these coatings has the same defects of lowered toughness and lowered chemical resistance as it has in the case of the high molecular weight polymers.

Polyethylene has been applied by a flame spraying technique (De Long and Peterson, Chemical Engineering, June 1949, page 123). This method gives thick coatings (30 to 50 mols) but is expensive, requiring considerable labor.

It is an object of this invention to provide a process for producing a continuous film of substantially pure high molecular weight polyethylene of Grade 10 or lower upon a metallic or other surface. A further object is to provide a process which will give good adhesion of polyethylene to the surface. A further object is to provide a process which will be convenient to carry out and one that is low in cost. A further object is to provide a process in which the thickness of the coating may be varied over a wide range. A still further object is to provide compositions for carrying out these processes.

I have found that tough, continuous, adherent films of substantially pure high molecular weight polyethylene can be produced on metallic and other surfaces by mixing a finely divided high boiling (150° to 300° C.) but volatile material, which is a solvent for polyethylene at temperatures above 120° C. with powdered polyethylene and applying this mixture in the form of a powder to the surface to be coated with subsequent baking at temperatures of 120° to 230° C. and below the atmospheric boiling point for a long enough period to remove substantially all of the solvent (10 minutes to one hour). Suitable solvents for this purpose are the solid hydrocarbons and chlorinated hydrocarbons particularly of the cyclic series boiling between 150° and 300° C., such as naphthalene, diphenyl, dibenzyl, acenaphthene, paradichlorobenzene and the dichloronophthalenes. Liquid solvents such as tetralin, decalin, orthodichlorobenzene, trichlorobenzene or alpha-chloronaphthalene may also be used if the percentage of liquid is kept low enough (20% to 30%) that the resulting mixture is a free flowing powder. The solvents act similarly to a flux by dissolving in the molten polyethylene when heated to their melting point, and reduce its viscosity sufficiently to allow it to flow and form a continuous film. After the continuous film is formed, the solvent is then substantially all removed by evaporation below its boiling point, leaving a clear, smooth, continuous film of essentially pure polyethylene. Films up to 60 mils (0.06 inch) thick may be formed by one application, and films over 100 mils (0.1 inch) thick may be formed by multiple applications.

The powdered mixture of polyethylene and solvent material is caused to adhere to the surface of the metal or the material to be coated by heating the metal or the material to a temperature which will cause some melting of the powder or by electrostatic application in which the dust particles are caused to adhere by inducing opposite electrostatic charges to the material and to the dust particles.

The temperature and time of baking depend upon the boiling point of the solvent used. The baking temperature should not exceed the boiling point of the solvent as this may cause it to evaporate before a continuous film is formed. For best results the minimum baking times at various temperatures are as follows:

| Temperature, °C. | Minimum Baking Time, Minutes |
| --- | --- |
| 120 | 30 |
| 150 | 20 |
| 200 | 15 |
| 230 | 10 |

The solvent when used as a solid should preferably be in the form of particles small enough to pass through a 10 mesh screen, and conveniently is used in an amount that may vary from 20% to 200% of the polyethylene by weight. Mixtures of solvents may be used, if desired.

The fineness of the polyethylene powder can range from that which will pass 100% through a 10 mesh screen to that which will pass 100% through a 100 mesh screen. Powder coarser than 10 mesh does not readily form continuous and smooth films and powder finer than 100 mesh is extremely difficult to produce by known methods, but is useful if obtained.

For best results, the proportions of polyethylene and solvents will be selected according to the solvent employed, the fineness of the polyethylene and the baking temperature. They can vary from around 2 parts of solvent per part of polyethylene at 120° C. using 20 mesh polyethylene, to 0.20 part of solvent per part of polyethylene at 230° C. using 50 mesh polyethylene.

This coating composition may be applied by any of the methods known to the art such as sprinkling with the powder, dusting by blowing in a current of gas, electrostatic application such as broadly suggested in U. S. Patent 1,855,869, dry brushing, centrifugal dusting, etc. The excess may be removed by vibration, a current of air, or any other means.

The coatings obtained by using these compositions are smooth, continuous and extremely tough. They adhere well to steel and many other materials. While their adhesion directly to aluminum and copper is not as good as to steel, it may be improved through use of an adhesive undercoat on the surface, such as a solvent solution of polyethylene sulfonamide, which is particularly described in co-pending application of Bradley, Serial No. 102,929, filed July 2, 1949, now Patent No. 2,615,000. The polyethylene sulfonamide may also be employed with advantage as an undercoat on other surfaces, including steel, if desired. These films of the polyethylene will not crack or separate from the metal even after bending back and forth through an angle of 180° many times. They also adhere well to glass, wood, closely woven textiles including glass fibers, cardboard, etc. They are non-porous and may be exposed, when applied to steel, to a solution of copper sulfate and hydrochloric acid indefinitely without developing any of the copper deposits that are an indication of pores. The thinner films are virtually transparent and markings on the surface such as stenciling may be clearly seen through them. Polyethylene is somewhat hydrophobic and because of this property and the smoothness of the coating surfaces coated with these films may easily be cleaned of foreign matter by simple washing.

A quantitative determination of the adhesion of polyethylene to polished steel surfaces may be made by coating two polished steel plates with the composition of this invention and placing them together so that the polyethylene acts as a bond, after baking for one-half hour. When this assembly is tested in a tensile strength apparatus, a stress of as high as 1175 pounds per square inch has been found necessary to break the bond. The tensile strength determined in this manner will of course vary, depending upon the thickness of the polyethylene layer and the amount of solvent that may not have been volatilized during the baking process, and is used only for comparative examination to determine the relative adhesiveness of the film to the steel plates.

The following examples are given to illustrate the invention. Parts used are by weight, unless otherwise specified.

*Example 1*

A mixture of 35 parts of polyethylene of Grade 2 (50 mesh) and 65 parts of powdered naphthalene (20 mesh) is dusted on a shot blasted steel panel that has been heated to 120° C. After one minute the excess powder is removed by lightly tapping the inverted panel. The panel is baked at 120° C. for 30 minutes with good ventilation. The resultant coating upon cooling is continuous, essentially free of solvent, and, when subjected to the test as described above, shows good adhesion.

*Example 2*

A mixture of 60 parts of polyethylene of Grade 2 (50 mesh) and 40 parts of acenaphthene (20 mesh) is dusted on a shot blasted steel panel that has been heated to 150° C. After one minute the excess powder is removed by tapping the inverted panel and the panel is baked at 150° C. for 60 minutes. The resultant coating upon cooling is continuous, smooth, essentially free of solvent and, when subjected to the test as described above, shows good adhesion.

*Example 3*

A mixture of 35% polyethylene of Grade 2 (20 mesh) and 65% naphthalene (20 mesh) is dusted on a smooth steel panel at 150° C. After one minute the excess powder is removed by tapping the inverted panel and the panel is baked at 150° C. for 60 minutes. The resulting film is smooth, continuous and adherent when tested as described above.

*Example 4*

A mixture of 35 parts of polyethylene of Grade 0.005 (100 mesh) and 65 parts of powdered diphenyl (60 mesh) is dusted on a smooth steel panel at 230° C. After 30 seconds the excess powder is removed by tapping the inverted panel, the panel is baked at 230° C. for 20 minutes. The resultant coating is smooth, essentially free of solvents, continuous and adherent when tested as described above.

*Example 5*

A cold, shot blasted one gallon pail is grounded, and a —30,000 v. potential applied to a wire supported in front of the open mouth of the pail so as to produce a strong electrostatic field within the pail. A mixture of 80 parts of polyethylene of Grade 2 (50 mesh) and 20 parts of powdered naphthalene (20 mesh) is blown in from a "floc" gun. The excess powder is removed by tapping the inverted pail, and the pail is baked at 200° C. for 20 minutes. A smooth coating is obtained which is continuous except around the bottom seam. A second application closes the holes in the bottom seam.

The "floc gun" used in this example is a device commonly used to apply finely divided cotton floc to surfaces coated with adhesive in the formation of various commercial products. It consists of a device for suspending the finely divided floc in a current of air and projecting this suspension from a jet against the surface to be coated. In its place various devices used for the application of insecticidal dust may be used.

*Example 6*

A sheet of aluminum was first coated with polyethylene sulfonamide in the form of a 2% solution in methyl-isobutyl ketone. The metal was then heated to 200° C. and dusted with the mixture of polyethylene and naphthalene as used in Example 5. After the excess powder was removed, the coated sheet was baked at 200° C. for 20 minutes. A continuous film adhering well to the aluminum, resulted. This adhesion was greater than 750 lbs. per square inch for when the adhesion was determined, as described above, the bond between the sulfonamide and the polyethylene gave way when this stress was applied, but the sulfonamide continued to adhere to the aluminum.

*Example 7*

Example 1 was repeated, except that a wooden panel, a tightly woven cotton cloth (filter cloth) and a heavy cardboard were used in separate experiments in place of the steel. Good adhesion and continuous film were obtained in all cases.

Shipping drums coated with polyethylene, using a powdered mixture as employed in Example 5 above but in which the dust was applied to the drum heated to 200° C., with the excess removed by inverting the drums, have been found very suitable for the shipping of many chemicals which cannot ordinarily be shipped in iron drums. Vat dye pastes containing the usual dispersing agents and stabilizers, wetting agents such as the higher molecular weight alkyl sulfates, water-repellents and other textile treating agents, thioindigo dye pastes, and various azo dye intermediates in both the form of the free sulfonic acid and the sodium salts have been stored in drums coated with polyethylene in the manner above described, and, on inspection after a period of from 70 to 90 days, the polyethylene coating was found to be in excellent condition.

This method of coating is applicable not only to the coating of large flat or curved sheet metal surfaces, but may be employed in the coating of wires, rods, screens or various irregularly shaped objects.

I claim:

1. A method of coating surfaces with polyethylene having a melting point of at least 105° C. and a viscosity at 190° of at least 25,000 poises, which comprises applying to the surface to be coated a powdered mixture of such polyethylene and from 20% to 200%, based on the weight of the polyethylene, of a volatile solvent material of the class consisting of hydrocarbons and chlorinated hydrocarbons having a boiling point of 150° to 300° C. and which dissolves polyethylene at temperatures above 120° C., and baking the material coated with said mixture at temperatures of 120° to 230° C. but below the atmospheric boiling point of the solvent material until substantially all of the solvent is removed.

2. A method, as defined in claim 1, wherein the surface which is coated is metallic.

3. A method, as defined in claim 1, wherein the surface which is coated is steel.

4. A method, as defined in claim 1, wherein the surface which is coated comprises polyethylene sulfonamide coated aluminum.

5. A method, as defined in claim 1, wherein the surface which is coated is cellulosic.

6. A method, as defined in claim 1, wherein the surface which is coated is wood.

7. A method, as defined in claim 1, wherein the surface which is coated is cardboard.

8. A method, as defined in claim 1, wherein the surface which is coated is cotton cloth.

9. A method of coating surfaces with polyethylene having a melting point of at least 105° C. and a viscosity at 190° of at least 25,000 poises, which comprises applying to the surface to be coated a powdered mixture of such polyethylene and from 20% to 200%, based on the weight of the polyethylene, of naphthalene, and baking the material coated with said mixture at temperatures of 120° to 230° C. but below the atmospheric boiling point of the solvent material until substantially all of the solvent is removed.

10. A method of coating surfaces with polyethylene having a melting point of at least 105° C. and a viscosity at 190° of at least 25,000 poises, which comprises applying to the surface to be coated a powdered mixture of such polyethylene and from 20% to 200%, based on the weight of the polyethylene, of diphenyl, and baking the material coated with said mixture at temperatures of 120° to 230° C. but below the atmospheric boiling point of the solvent material until substantially all of the solvent is removed.

WILFORD E. RAILING.

References Cited in the file of this patent

UNITED STATES PATENTS

| Number | Name | Date |
|---|---|---|
| 2,340,452 | Child | Feb. 1, 1944 |
| 2,406,039 | Roedel | Aug. 20, 1946 |
| 2,414,497 | Warner et al. | Jan. 21, 1947 |

FOREIGN PATENTS

| Number | Country | Date |
|---|---|---|
| 8,417 | Great Britain | 1913 |
| 585,395 | Great Britain | Feb. 6, 1947 |
| 586,768 | Great Britain | Mar. 31, 1947 |